United States Patent [19]

Beitzel

[11] 4,274,970
[45] Jun. 23, 1981

[54] METHOD AND APPARATUS FOR TREATING WATER

[76] Inventor: Stuart W. Beitzel, 1480 Cabrillo Park Dr., #A, Santa Ana, Calif. 92701

[21] Appl. No.: 89,140

[22] Filed: Oct. 29, 1979

[51] Int. Cl.³ .............................. C02F 1/32; C02F 1/78
[52] U.S. Cl. ............................ 210/748; 204/157.1 R; 210/760; 210/764; 210/150; 210/192; 210/205; 210/256; 422/24; 422/186; 250/434
[58] Field of Search .............. 204/157.1 R; 210/63 R, 210/63 Z, 64, 150, 192, 198 R, 199, 205, 256, 257 R, 258, 748, 758, 760, 764; 250/432 R, 434, 437, 532, 533, 538, 539; 422/24, 186

[56] References Cited

U.S. PATENT DOCUMENTS

| 996,560 | 6/1911 | Bradley | 210/192 |
|---|---|---|---|
| 2,070,307 | 2/1937 | Nicholls | 250/432 R |
| 3,433,946 | 3/1969 | Hardwick | 250/432 R |
| 3,628,010 | 12/1971 | Tarkoey et al. | 250/432 R |
| 3,659,096 | 4/1972 | Kompanek | 210/64 |
| 4,008,045 | 2/1977 | Free | 250/437 |
| 4,116,630 | 9/1978 | Meacham et al. | 422/24 |
| 4,156,652 | 5/1979 | Wiest | 210/63 Z |
| 4,189,363 | 2/1980 | Beitzel | 422/24 |

FOREIGN PATENT DOCUMENTS 2382928  11/1978  France .............................. 204/157.1 R Primary Examiner—Peter A. Hruskoci
Attorney, Agent, or Firm—Edward D. O'Brian

[57] ABSTRACT

Water may be treated so as to kill microorganisms and so as to oxidize oxidizable material within it by passing a thin film of water in contact with a gaseous body or bubble of air containing both oxygen and ozone while concurrently radiating both the water film and the gas bubble with ultraviolet radiation capable of causing the formation of ozone and killing microorganisms. The water which has been in contact with the gas bubble is collected into a body of water which is thereafter radiated with the same ultraviolet radiation while the water within the body is moved turbulently. This treatment can conveniently be carried out utilizing two containers transparent to the radiation used which are connected at their bottoms. Such containers are preferably located immediately adjacent to an ultraviolet lamp used as the source of the radiation.

18 Claims, 1 Drawing Figure

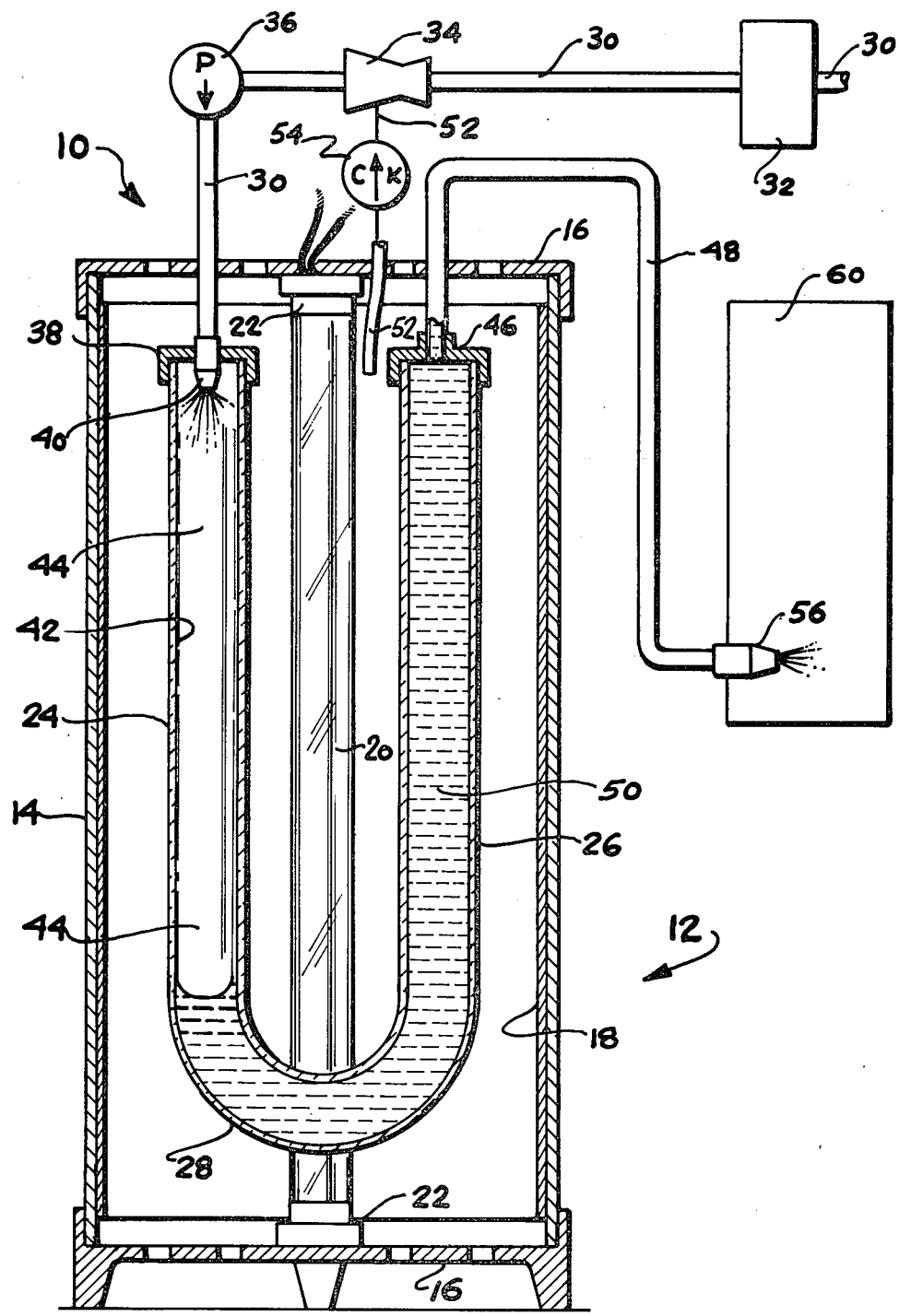

METHOD AND APPARATUS FOR TREATING WATER

BACKGROUND OF THE INVENTION

The invention set forth in this specification pertains to new and improved treatment of water so as to kill microorganisms within the water and so as to oxidize oxidizable material such as various organic materials within the water. The intent of such treatment is to make the water treated safer for human consumption.

An understanding of the present invention does not require a detailed discussion of the long standing recognition of the fact that many different human ailments result from the consumption of water contaminated with a variety of different types of microorganisms and/or water contaminated with a wide variety of different materials of an organic character which are capable of being oxidized so as to be capable of being safely consumed by humans. Neither does an understanding of this invention require a detailed consideration of all of the various methods and all of the various different types of apparatuses which have previously been utilized in order to treat water so as to kill microorganisms and/or so as to oxidize various different oxidizable materials. Many different types and varieties of water treatments have been proposed and utilized in the past in efforts to provide potable water.

It is considered that in spite of all this activity in connection with the treatment of water that there is a need for various new and improved ways of treating water so as to obtain potable water. The nature of this manner of fulfilling the need for new ways of treating water so as to improve its potability of course depends upon many different factors, such as, for example, where the need to obtain potable water exists, and the presence or absence of various utilities at any such location. Thus, for example, the manner of treating water so as to improve its potability in the established water distribution system in a large scale metropolitan area is different from the manner of treating water in areas where no large scale water treatment or distribution system exists.

BRIEF SUMMARY OF THE INVENTION

The present invention is primarily intended to fulfill the need for a new and improved treatment of water in areas or locations where large scale water distribution systems do not exist or are, for one reason or another, unsatisfactory in providing potable water and need to be supplemented. This invention is intended to provide both a new and improved method and apparatus for treating water of a comparatively simple, comparatively inexpensive, comparatively effective type which can be used or operated for prolonged periods with minimal maintenance and which can be employed in many different locations.

It is considered that because of the nature of the method and apparatus set forth herein that the invention is particularly suited for use in supplying potable water at locations where the need for potable water is fairly limited. Included in such locations are individual homes, such as homes located in remote areas, various types of movable or portable housing, such as, for example, travel trailers, boats inhabited by individuals and various other similar or reasonably related locations.

Those aspects of this invention which are primarily directed to a method are achieved by providing a method for treating water so as to kill microorganisms within said water and so as to oxidize oxidizable material within said water which comprises: placing a thin film of water in contact with a gaseous body containing a gas reactant selected from the group consisting of oxygen, ozone and mixtures thereof while exposing both said film and said gaseous body to ultraviolet radiation of a frequency and of an intensity capable of causing the formation of ozone and killing microorganisms; said film being sufficiently thin to enable substantially all of said water within said film to be in contact with said gaseous body during movement of said film in contact with said gaseous body; collecting the water from within said film which has been in contact with said gaseous body so as to form a liquid body of water; exposing said liquid body of said water to ultraviolet radiation of a frequency and of an intensity capable of causing the formation of ozone and killing microorganisms while moving said water within said body under turbulent conditions sufficient to continuously mix said water within said liquid body.

Those aspects of this invention which are primarily directed to an apparatus are achieved by providing an apparatus for treating water so as to kill microorganisms and so as to oxidize oxidizable material within said water which comprises: first and second containers, each of said containers having a top and a bottom; connecting means placing the bottoms of said containers in liquid communication with one another; inlet means for enclosing the top of said first container and for passing a stream of water into the top of said first container so that said stream of water forms a thin film of water along an interior wall within said first container which will pass downwardly toward the bottom of said first container through the action of gravity; outlet means located at the top of said second container for creating a back pressure sufficient to retain a body of water within said second container and within said connecting means; ultraviolet radiation source means for producing ultraviolet radiation of a frequency and of an intensity capable of causing the formation of ozone and killing microorganisms for exposing gas trapped within said first container between the top and bottom thereof and a film of water against said wall within said first container to ultraviolet radiation; and for exposing a body of water within said second container to ultraviolet radiation.

BRIEF DESCRIPTION OF THE DRAWING

Because of the nature of this invention it is best more fully explained or described with reference to the accompanying drawings in which the FIGURE is a diagrammatic illustration of a presently preferred embodiment or form of an apparatus in accordance with this invention in which certain parts are shown in cross-section.

It is to be understood that the accompanying drawing is not to be taken as limiting the invention in any respect. From a detailed consideration of this specification it will be apparent that the concepts of the invention as set forth and defined in the appended claims can be easily utilized in different manners, as, for example, with differently appearing equipment through the use or exercise of what is considered to be normal, routine engineering skill in the field of the treatment of water through the use of ultraviolet radiation.

DETAILED DESCRIPTION

In the drawing there is shown an apparatus 10 which includes a centrally located treatment unit 12. This unit 12 includes an elongated cylindrical housing 14 which is preferably impervious to and unaffected by ultraviolet light having perforate end closures 16 of the same or a similar material. These end closures 16 are perforated to a sufficient extent so as to allow or permit the passage of air into and out of the housing 14 as the apparatus 10 is used. The housing 14 and the end closures 16 are considered to be primarily desirable in preventing ultraviolet radiation from escaping outside of the treatment unit 12 as the apparatus 10 is used. Preferably, but not necessarily, the interior of the housing 14 is provided with a reflective coating 18 which reflects any radiation reaching it.

Within the interior of the treatment unit 12 there is located an elongated tubular lamp 20 of a known type for producing ultraviolet radiation of a frequency and of an intensity capable of causing the formation of ozone and capable of killing at least most microorganisms of the type capable of contaminating water. This lamp 20 is mounted vertically on conventional terminals 22. These terminals 22 are connected to an appropriate source (not shown) of electric current in a conventional manner.

This lamp 20 is located immediately adjacent and parallel to, and equidistant from, a first elongated tube 24 and a second elongated tube 26. These tubes 24 and 26 may be referred to as containers and are connected at their bottoms (not separately numbered) by a short connecting tube or means 28. With the particular apparatus 10, the two tubes 24 and 26, and the connecting tube 28, are formed integrally with one another so as to have a generally U-shape. If desired, however, they may be constructed as separate, connected parts. Conventional, inert supports (not shown) are, of course, preferably used inside of the housing 14 so as to secure the tubes 24, 26 and 28 against movement. Preferably the lamp 20 is located as close to the tubes 24 and 26 as reasonably practical. At least both the tubes 24 and 26 should be formed of a material such as a type of glass which is transparent or substantially transparent to the radiation produced by the lamp 20.

It is considered that the use of glass as indicated is preferred with the apparatus 10 in forming at least the tubes 24 and 26 because of the ability of such glass to transmit ultraviolet radiation as noted and because of the inert character of such glass. It is also considered, however, that other materials, such as, for example, various grades of polytetrafluoroethylene, can be satisfactorily utilized in constructing the tubes 24 and 26 and, where desired, in constructing an integral connecting tube 28.

The first tube 24 is preferably supplied with water obtained through any conventional type line or conduit 30 from any convenient water source. The line 30 preferably includes a conventional filter 32 intended to remove contaminants capable of being removed by filtration so as to avoid any possible interference with the apparatus 10 as a result of the presence of such contaminants. Although many different types of filters may be used, it is preferred that the filter 32 utilize an activated carbon filter media because activated carbon will tend to absorb many different types of contaminants.

The line 30 preferably also contains a small aspirator or aspirator-type conventional fitting 34 so that filtered water passes through this fitting 34 prior to its being utilized within the treatment unit 12. This line 30 also preferably contains a small pump 36 which is used in order to supply water through the line 30 to a small inlet fitting 38 located on the uppermost extremity (not separately numbered) of the first tube 24.

It is considered most advantageous to employ a variable speed pump so that it is capable of being utilized in varying the pressure and volume of the water supplied through the line 30 to the treatment unit 12. At times it is possible to dispense with the use of the pump 36 when the water furnished through the line 30 to the filter 32 is under adequate pressure for operation of the apparatus 10 as the result of obtaining water from a pressurized water system. When the water used is obtained from such a pressurized water system it may be advantageous to utilize instead of the pump 36 a conventional valve (not shown) capable of being used so as to control the pressure of the water passing the valve.

With the apparatus 10 the inlet fitting 38 serves several functions. It serves to close off the uppermost extremity or end of the tube 24 so as to prevent the escape of gas out of it. It also holds a small nozzle 40 so that this nozzle directs water from within the line 30 generally along and over the interior of the tube 24 so that such water passes as a thin film 42 extending substantially completely around the interior of the tube 24 downwardly toward the bottom of this tube 24. The film 42 described which is exposed to this gaseous body 44 is considered to be formed essentially as a result of the surface tension or adhesion of the water supplied to the wall of the tube 24. The thickness of this film is considered rather important to the invention.

It should be as thin as reasonably possible in order to provide as much surface area of the water within the film 42 within the interior of the tube 24 for exposure to a large gaseous body 44 or bubble which is formed within the interior of the tube 24 as a result of air being trapped in this tube 24 as water is supplied to the unit 12 as described. Depending upon conditions of operation this gaseous body 44 may be a single gas bubble or a series of gas bubbles.

This film, of course, moves downwardly through the action of gravity. In general the higher the temperature of the water used the more satisfactory the results obtained since an increase in the temperature tends to make the film 42 somewhat thinner and since various reactions such as oxidation reactions are to a degree promoted at elevated temperatures. The water employed should, however, be sufficiently below boiling point of water so that vaporization of water does not become any significant problem. Satisfactory results are achieved utilizing water at normal ambient temperatures.

The water moving down the tube 24 in the film 42 collects generally within the region of the connecting tube 28. In this regard the connecting tube 28 can be considered as a type of water trap or seal serving to retain the gaseous body 44 within the tube 24. As the apparatus 10 is initially operated the pressure on the incoming water will force the water accumulating within the connecting tube 28 upwardly so as to displace any gas from within the tube 26 until water will in time be exhausted through an outlet fitting 46 connected to another line or conduit 48. At this point a body of water 50 will be present in the tube 26. In a sense the fitting 46 acts as a flow restriction tending to slightly "bind up" the pressures within the interiors of the tubes 24 and 26.

As the water moves in this manner, the shape of the connecting tube 28 will tend to cause the water moving upwardly within the tube 26 to move through this tube 26 in a turbulent manner so that there is constant mixing of water within this tube 26. If desired various other expedients can be employed in order to promote such turbulence. For example, ridges or the like (not shown) may be located in the connecting tube 28 so as to ensure turbulent flow. Similar expedients (not shown) can also be employed within the interior of the tube 26.

During the use of the apparatus 10 as water is moved as described in the preceding, ultraviolet radiation from the lamp 20 will be transmitted through the tube 24 into the interior of this tube 24. Within the interior of this tube 24 such radiation will promote and cause the formation of ozone from the oxygen present in the air within the gaseous body 44. Concurrently both oxygen and ozone will be exposed to the film 42. As this occurs, the water within this film 42 will come in contact with this oxygen and the ozone, and concurrently oxidation of any oxidizable materials present within the water will take place to at least a degree.

The degree of such oxidation will depend upon the time of contact between the film 42 and the gaseous body 44. Preferably the film 42 is in contact with the gaseous body 44 at least long enough so as to become substantially saturated with oxygen and ozone. This amount of time will depend upon the precise dimensions employed in constructing the complete apparatus 10. The radiation reaching the film 42 will, of course, tend to directly kill any microorganisms present within this film 42 to at least a degree.

With the apparatus 10 such killing action and such oxidation continues as the body of water 50 passes upwardly through the tube 26. Within the tube 26 this body of water will normally contain sufficient oxygen and ozone so that in the time that it is present within the tube 26 substantially complete oxidation of any organic material present will occur. Also, within the tube 26 normally what may be termed an "overkill" of microorganisms will occur because of the continued exposure to ultraviolet radiation. The efficiency of the use of such radiation is considered to be promoted by virtue of the fact that the reflective coating 18 will continuously reflect any ultraviolet radiation reaching it so that such radiation passes back and forth within the treatment unit 12 until it is absorbed.

As a result of the manner of use of the treatment unit 12 described, some gas will continuously be removed from the gaseous body 44. Because of this, it is considered desirable to provide makeup air to the gaseous body 44 to replenish the gas removed from this body 44. Although this can be accomplished in many ways it is preferred to accomplish this through the use of a small tube or line 52 which leads from within the interior of the treatment unit 12 immediately adjacent to the lamp 20 to the fitting 34. Preferably this tube 52 contains a known type of check valve 54 designed to prevent any possibility of water getting into the treatment unit 12.

During the operation of the apparatus 10 the air within the treatment unit 12 reasonably adjacent the lamp 20 will be affected by the operation of the lamp 20 so as to cause the formation of what may be referred to as an air-ozone mixture. Such a mixture will be pulled through the tube 52 by virtue of the operation of the aspirator fitting 34 so as to be mixed with water passing through the line 30. If desired, a small conventional valve 54 may be located in the tube 52 so as to control such movement. Further mixing will, of course, occur as a result of the operation of the pump 36. This manner of replenishing air has the advantage that it utilizes ozone produced by the operation of the lamp 20 so as to tend to partially oxidize any oxidizable contaminants present in the water treated prior to this water being treated within the treatment unit 12.

The water passing through the line 48 may normally be utilized directly without further treatment. This water passing through the line 48 will normally contain a reasonable amount of both oxygen and ozone which can be effectively utilized in order to aid in maintaining the purified nature of this water as it is stored prior to being utilized. It is presently preferred to store this water passing through the line 48 by passing it through a mixing nozzle 56 located at an inlet 58 to a storage tank 60 in which the water passing into the nozzle 56 from the line 48 is admixed with water already within the tank 60. A suitable nozzle of this type is shown and described in the Stuart W. Beitzel U.S. patent application Ser. No. 013,145, filed Feb. 21, 1979, entitled "PROCESS OF PRODUCING OZONE IN WATER".

It is considered that it is important to note that in a sense the treatment unit 12 employed may be referred to as being "self-adjusting". During the operation of the apparatus 10 on occasion an undesired quantity of gas may accumulate within the tube 24 and such quantity may be sufficient so that the gaseous body 44 is so large as to occupy the connecting tube 28 and so large as to tend to "bubble up" into the tube 26. Any gas entering the tube 26 will normally move to the top of this tube 26 and will be conveyed out of the treatment unit 12 through the line or conduit 48. This will tend to reestablish a desired volume of the gaseous body 44 such that this gaseous body 44 is entirely contained within the tube 24 and to a minor extent in adjacent portions of the tube 28.

Because the treatment unit 12 operates in this manner so as to substantially automatically maintain a constant volume of the gaseous body 44, there is no significant handicap in operating the apparatus 10 so that the amount of gas entering the treatment unit 12 by way of the tube 52 and the aspirator 34 is somewhat in excess of the amount of gas needed to replenish gas taken out of the gaseous body 44 by the movement of water through the treatment unit 12.

I claim:

1. A method for treating water so as to kill microorganisms within said water and so as to oxidize oxidizable material within said water which comprises:

passing a thin film of water downwardly along an interior wall of a vertically extending first container in contact with a gaseous body maintained therein containing a gas reactant selected from the group consisting of oxygen, ozone and mixtures thereof while exposing both said film and said gaseous body to ultraviolet radiation of a frequency and of an intensity capable of causing the formation of ozone and killing microorganisms, said first container being substantially transparent to said ultraviolet radiation, said film being sufficiently thin to enable substantially all of said water within said film to be in contact with said gaseous body during movement of said film in contact with said gaseous body said film is formed by directing said water against an upper portion of said interior wall, said interior wall being of such a character that said water directed toward it adheres to said wall as a result of surface tension and moves downwardly along said interior wall as a result of the action of gravity, collecting the water from within said film which has been in contact with said gaseous body at the bottom of said first container and passing said collected water in a body within a second container said gaseous body is maintained within said first container by restricting the flow of water through said containers, exposing said body of water in said second container to ultraviolet radiation of a frequency and of an intensity capable of causing the formation of ozone and killing microorganisms while moving said water within said body under turbulent conditions sufficient to continuously mix with water within said liquid body, said second container being substantially transparent to said ultraviolet radiation.

2. A method as claimed in claim 1 wherein:
said film of said water is in contact with said gaseous body for a sufficient period of time so as to substantially saturate said water within said film with oxygen and ozone.

3. A method as claimed in claim 1 wherein:
said water is exposed to said ultraviolet radiation while in contact with said gaseous body and while within said liquid body for a time period sufficient to kill substantially all of the microorganisms within said water.

4. A method as claimed in claim 1 wherein:
said film of said water is in contact with said gaseous body for a sufficient period of time so as to substantially saturate said water within said film with oxygen and ozone,
said water is exposed to said ultraviolet radiation while in contact with said gaseous body and while within said liquid body for a time period sufficient to kill substantially all of the microorganisms within said water.

5. A method as claimed in claim 1 wherein:
said stream of water contains sufficient of said gas reactant as is necessary to replenish such gas as it is removed from said gaseous body as said method is carried out.

6. A method as claimed in claim 1 wherein:
both of said containers receive said ultraviolet radiation from a single ultraviolet radiation source.

7. A method as claimed in claim 6 wherein: said ultraviolet radiation source is located in air,
said stream of water contains a mixture of air and ozone produced adjacent to said radiation source from air by radiation from said radiation source, said mixture of air and ozone being present within said stream of water as it is introduced into said first mentioned container being present in an amount sufficient to replenish such gas as is removed from said gaseous body as a result of movement of water through said containers.

8. A method as claimed in claim 1 wherein:
said stream of water contains sufficient of said gas reactant as is necessary to replenish such gas as it is removed from said gaseous body as said method is carried out,
both of said containers receive said ultraviolet radiation from a single ultraviolet radiation source,
said ultraviolet radiation source is located in air,
said stream of water contains a mixture of air and ozone produced adjacent to said radiation source from air by radiation from said radiation source, said mixture of air and ozone being present within said stream of water as it is introduced into said first mentioned container being present in an amount sufficient to replenish such gas as is removed from said gaseous body as a result of movement of water through said containers.

9. An apparatus for treating water so as to kill microorganisms and so as to oxidize oxidizable material within said water which comprises:
first and second elongated, tubular containers, each of said containers having a top and a bottom and being substantially transparent to ultraviolet radiation,
connecting means placing the bottoms of said containers in liquid communication with one another,
inlet means for enclosing the top of said first container and for passing a stream of water into the top of said first container so that said stream of water forms a thin film of water along an interior wall within said first container which will pass downwardly toward the bottom of said first container through the action of gravity,
outlet means located at the top of said second container for creating a back pressure sufficient to retain a body of water within said second container and within said connecting means and a gaseous body in said first container,
a single ultraviolet radiation source means located adjacent to both of said containers and extending along the lengths of both of said containers for producing ultraviolet radiation of a frequency and of an intensity capable of causing the formation of ozone and killing microorganisms for exposing gas from said gaseous body trapped within said first container between the top and the bottom thereof and a film of water against said wall within said first container to ultraviolet radiation, and for exposing a body of water within said second container to ultraviolet radiation.

10. An apparatus as claimed in claim 9 including:
means for mixing a mixture of air and ozone produced by the radiation of air adjacent to said radiation source means into said stream of water introduced into said inlet means.

11. An apparatus as claimed in claim 10 wherein:
said means for mixing comprises aspirator means located in a conduit, said conduit being connected to said inlet means.

12. An apparatus as claimed in claim 11 wherein:
said means for mixing also including adjustable pump means located within said conduit.

13. An apparatus as claimed in claim 9 including:
means for mixing a mixture of air and ozone produced by the radiation of air adjacent to said radiation source means into said stream of water introduced into said inlet means,
said means for mixing comprises aspirator means located in a conduit, said conduit being connected to said inlet means,
said means for mixing also including adjustable pump means located within said conduit, said ultraviolet radiation source means comprising a tubular ultraviolet lamp located between and extending along said first and second containers.

14. A method for treating water so as to kill microorganisms within said water and so as to oxidize oxidizable material within said water which comprises:

placing a thin film of water in contact with a gaseous body containing a gas reactant selected from the group consisting of oxygen, ozone and mixtures within a first vertically extending container thereof while exposing both said film and said gaseous body to ultraviolet radiation of a frequency and of an intensity capable of causing the formation of ozone and killing microorganisms, said first container being substantially transparent to said untraviolet radiation, said film being formed by directing a stream of water against an upper portion of a wall within said first container, said wall being of such a character that said water directed toward it adheres to said wall as a result of surface tension and moves downwardly along said wall as a result of the action of gravity, said film being sufficiently thin to enable substantially all of said water within said film to be in contact with said gaseous body during movement of said film in contact with said gaseous body, collecting the water from within said film which has been in contact with said gaseous body at the bottom of said first container and conveying said collected water into the bottom of a second vertically extending container so as to form a liquid body of water within said second container, said second container being substantially transparent to said ultraviolet radiation, said gaseous body being maintained within said first container by restricting the flow of water through said containers, exposing said liquid body of said water to ultraviolet radiation of a frequency and of an intensity capable of causing the formation of ozone and killing microorganisms while moving said water upwardly within said body under turbulent conditions sufficient to continuously mix with water within said liquid body, said film of water is placed in contact with said gaseous body by water being continuously passed in contact with said gaseous body, collected water from within said film is continuously introduced into one end of said liquid body and is continuously moved from one extremity of said liquid body to another extremity of said liquid body.

15. A method as claimed in claim 14 wherein:
said stream of water contains sufficient of said gas reactant as is necessary to replenish such gas as it is removed from said gaseous body as said method is carried out.

16. A method as claimed in claim 14 wherein:
both of said containers receive said ultraviolet radiation from a single ultraviolet radiation source.

17. A method as claimed in claim 16 wherein:
said ultraviolet radiation source is located in air,
said stream of water contains a mixture of air and ozone produced adjacent to said radiation source from air by radiation from said radiation source, said mixture of air and ozone being present within said stream of water as it is introduced into said first mentioned container being present in an amount sufficient to replenish such gas as is removed from said gaseous body as a result of movement of water through said containers.

18. A method as claimed in claim 14 wherein:
said stream of water contains sufficient of said gas reactant as is necessary to replenish such gas as it is removed from said gaseous body as said method is carried out,
both of said containers receive said ultraviolet radiation from a single ultraviolet radiation source,
said ultraviolet radiation source is located in air,
said stream of water contains a mixture of air and ozone produced adjacent to said radiation source from air by radiation from said radiation source, said mixture of air and ozone being present within said stream of water as it is introduced into said first mentioned container being present in an amount sufficient to replenish such gas as is removed from said gaseous body as a result of movement of water through said containers.

* * * * *